United States Patent

Buddecke et al.

[11] Patent Number: 6,111,707
[45] Date of Patent: Aug. 29, 2000

[54] TAPE DUPLEXING WITH UNIQUE IDENTITY AND ERROR RECOVERY

[75] Inventors: Robert C. Buddecke; Cheryl Jean DeBolt Knapp; William McEwen; Anthony S. Pearson; Jerry W. Pence, all of Tucson, Ariz.

[73] Assignee: International Business Machines Corporation, Armonk, N.Y.

[21] Appl. No.: 09/001,599

[22] Filed: Dec. 31, 1997

[51] Int. Cl.[7] .................................. G11B 5/86; G11B 5/09
[52] U.S. Cl. .................................................. 360/15; 360/53
[58] Field of Search .......................................... 360/15, 53

[56] References Cited

U.S. PATENT DOCUMENTS

| | | | |
|---|---|---|---|
| 4,084,231 | 4/1978 | Capozzi et al. | 364/200 |
| 4,608,688 | 8/1986 | Hansen et al. | 371/11 |
| 4,872,070 | 10/1989 | Copper et al. | 360/15 |
| 5,235,683 | 8/1993 | Dahlerud | 395/275 |
| 5,311,374 | 5/1994 | Oh | 360/32 |
| 5,331,474 | 7/1994 | Lee | 360/13 |
| 5,502,600 | 3/1996 | Bernardini | 360/15 |
| 5,535,381 | 7/1996 | Kopper | 395/600 |

Primary Examiner—W. Chris Kim
Attorney, Agent, or Firm—Donald J. Pagel

[57] ABSTRACT

A method for creating a duplicate copy of a tape in which a first tape having a first data set name and a second tape having a second data set name are allocated. Data is written to the first and second tapes so that block for block, the data is located at the same position on each of the tapes. After data is written to one of the tapes, a check is made to verify that the data was written correctly. If an error is detected in writing the second tape, an error flag is set that indicates a copy of the first tape needs to be made. At various stages of the process, checks are made to determine if error flag is on. If the error flag is detected, writing the second tape is suspended.

16 Claims, 3 Drawing Sheets

TAPE DUPLEXING WITH UNIQUE IDENTITY AND ERROR RECOVERY

TECHNICAL FIELD

The present invention relates to a method for creating a backup tape and more particularly to a method in which two tapes are allocated with different tape data set names but are written concurrently and contain the same data.

BACKGROUND ART

The need to make a backup copy of data stored on various storage devices is well-known in the art. For example, making a tape backup of information stored on the hard drive of a server in a network is almost a routine process. As more and more information is stored on networks and databases, the importance of backup tapes will continue to increase.

An interesting consequence of the growing importance of backup tapes is that in many cases, it is now desirable to have a backup copy of the backup tape (i.e. a second backup copy). The second backup copy is useful, for example, in the situation where a fire or other disaster damages the server or computer system where the backup tape is located. Frequently, the backup tape will be at the same location as the server which the tape is backing up. In this situation, both the server and the backup tape could be destroyed, thereby causing the loss of all the relevant data. By making an exact copy of the original backup tape and keeping this second backup tape at a different location, the possibility of losing all of the data is greatly reduced.

SUMMARY OF THE PRESENT INVENTION

Briefly, the present invention comprises a method for simultaneously creating two uniquely identifiable yet identical output tapes at the same or different physical locations. The two tapes are allocated with different data set names, but the output data is written from the same data buffer. The unique names allow allocation through various routines to separate data servers which may be located at physically different sites.

A requirement of the duplex output tape creation, is to ensure that individual tapes and sets of multi-volume tapes will be replaceable by their copies, while still enabling high-speed positioning to any location on the tape for data recall or recovery. This requires that block for block, the data is located at the same position on each tape.

DETAILED DESCRIPTION OF THE PREFERRED EMBODIMENT

Figure 1:
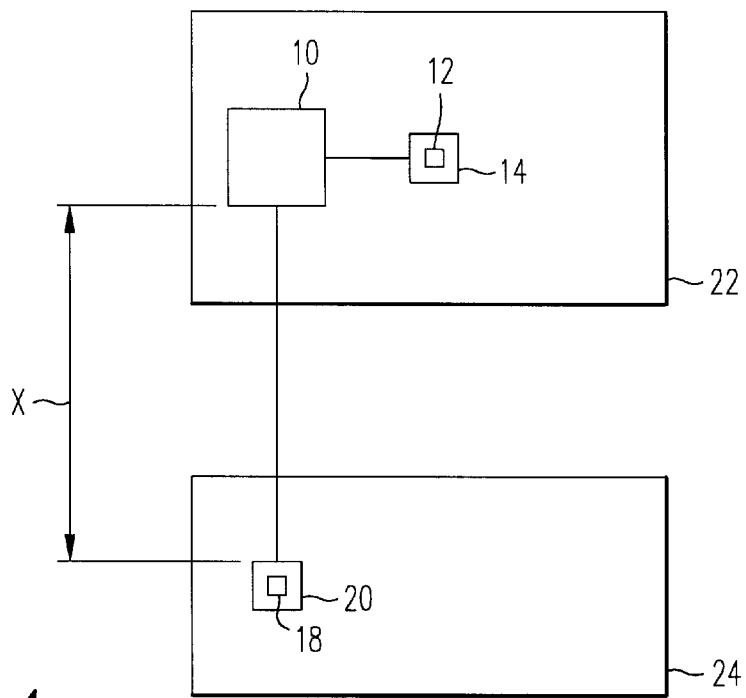
FIG. 1 is a schematic diagram of a computer system that utilizes the tape duplicating method according to the present invention.

FIG. 1 illustrates a mainframe computer 10 that can communicate with an original tape 12 that runs on a first tape drive 14. The computer 10 can also communicate with an alternate tape 18 that runs on a second tape drive 20. In the preferred embodiment, the computer 10 and the first drive 14 are located in a first facility 22. The second drive 20 is located in a second facility 24. One use of this configuration is that if for some reason the first facility 22 is destroyed (e.g. by fire, flooding, earthquake or other disaster), hopefully, the second facility will not be destroyed. The alternate tape 18 can then be used as a replacement for the original tape 12 which may have been damaged or destroyed. For purposes of this application, the tapes 12 and 18 represent a pair of tapes that are being written according to the present invention. Subsequent volumes of the tape 12 are still referred to as the tape 12, and subsequent volumes of the tape 18 are still referred to as the tape 18.

Typically, the second drive 20 is separated from the computer 10 by the distance "x," which can be up to the ESCON (Enterprise Systems Connection) distance of about forty-three kilometers. Of course, other orientations of the original and alternate tapes 12 and 18 can be used. For example, the alternate tape 18 and the second drive 20 can be located right next to each other within the first facility 22. In the preferred embodiment, the tapes 12 and 18 are cartridge storage tapes, such as IBM product Magstar 3599 magnetic tape.

Figure 2B:
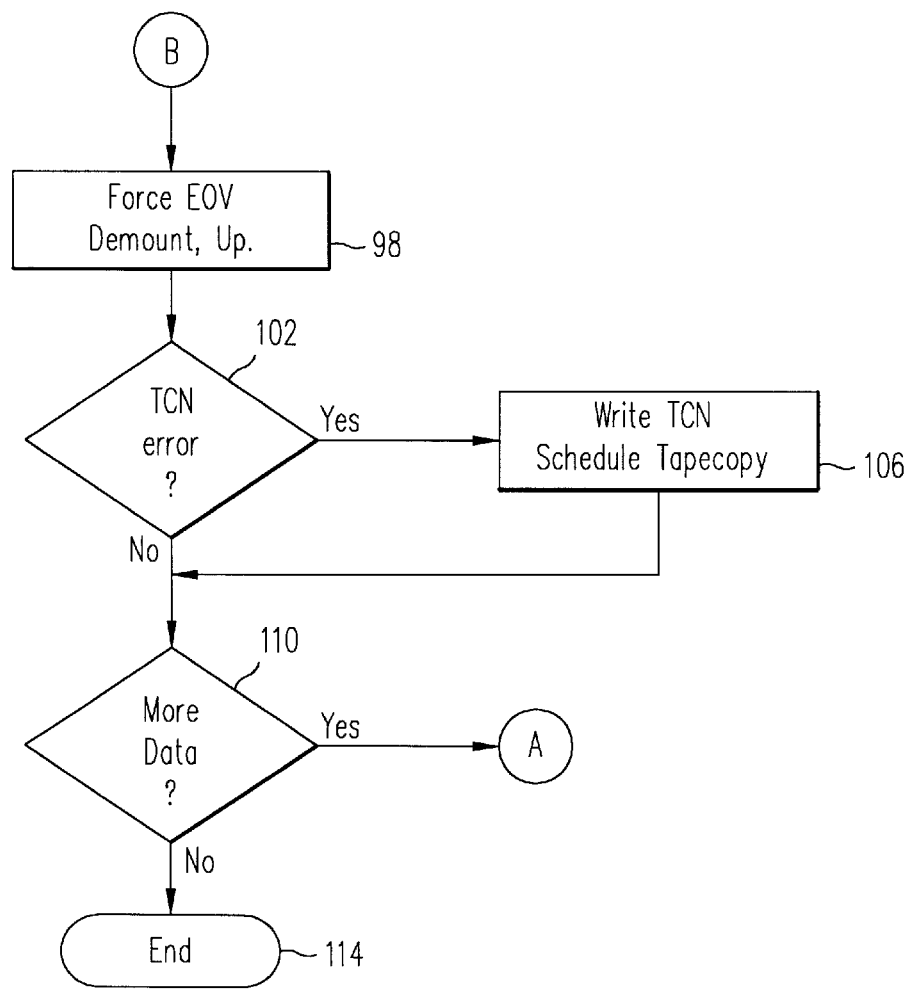
FIGS. 2A and 2B are flowcharts that illustrate the tape duplicating method according to the present invention.
Figure 2A:
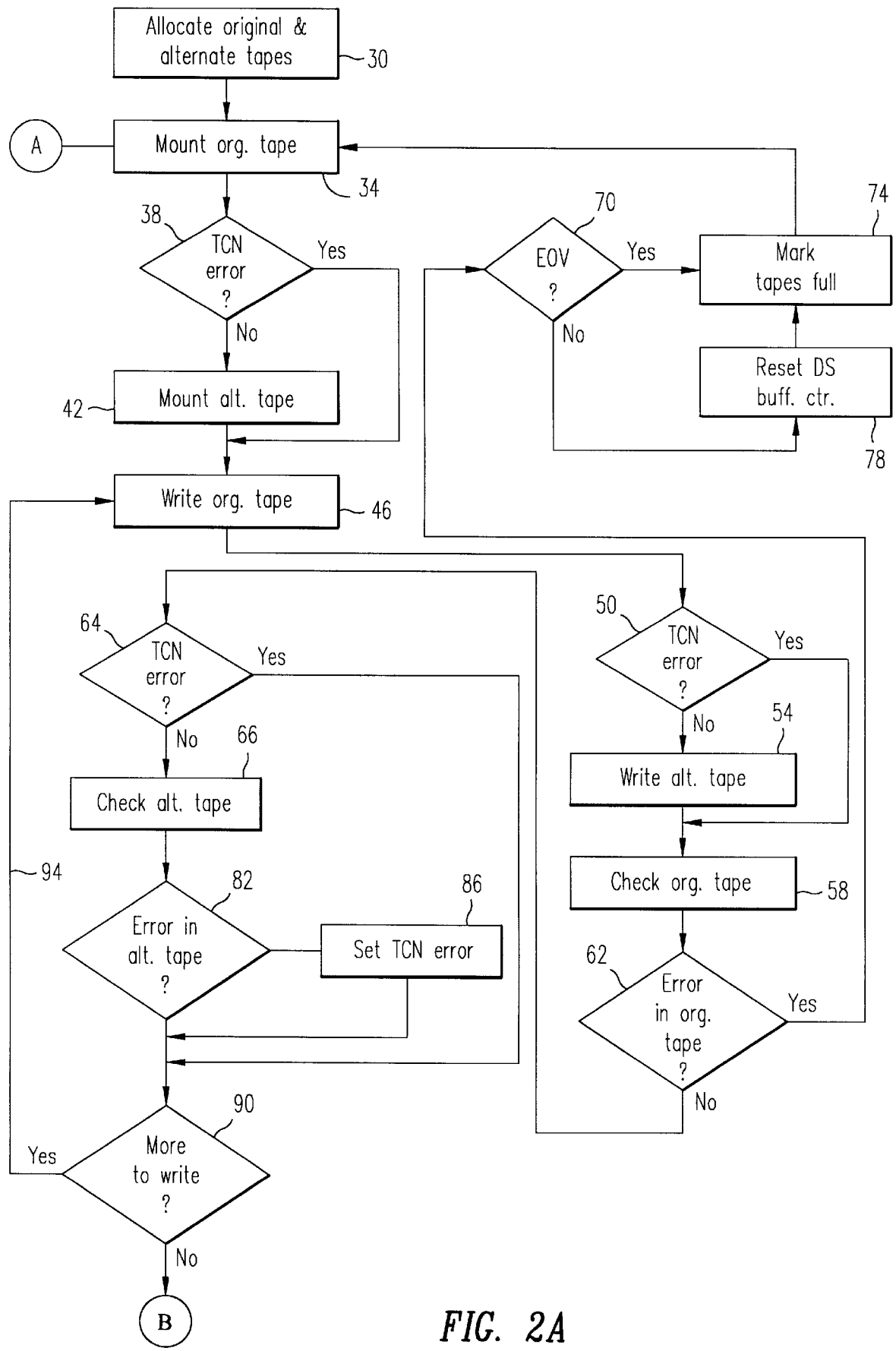

FIG. 2 is a flowchart that illustrates the method of the present invention. In step 30, the original tape 12 and the alternate tape 18 are allocated with different data set names. For example, the original tape 12 could be named DFHSM-.HMIGTAPE.DATASET and the alternate tape 18 could be named DFHSM.COPY.HMIGTAPE.DATASET. Because the original and alternate tapes have different data set names, the tapes may be located on the same server or on two different servers.

At step 34, the original tape 12 is mounted or loaded on the drive 14. At decision step 38, a check is made to determine if a TCN (tape copy needed) error exists. If a TCN error does not exist, then in step 42, the alternate tape 18 is mounted or loaded on the drive 20. After the tapes 12 and 18 (or other tapes being written) are mounted, then at step 46 a buffer is written to the original tape 12. If TCN error did exist at step 38, then step 42 is skipped because the alternate tape 18 does not need to be made. The TCN error will cause a copy of the original tape 12 to be made.

An important aspect of the tapes 12 and 18 is that they be exact copies of each other so that the individual tapes, and sets of multivolume tapes, will be replaceable by their copies. Additionally, high speed positioning to any location on the tape for data recall or recovery must be possible on the tapes 12 and 18 (or sets of tapes 12 and 18). This aspect is ensured by creating the tapes 12 and 18 so that the data sets spanning the tapes do so at the exact same block, regardless of the length of the tape on any given cartridge. This requires that block for block the data is located at the same position on each of tapes 12 and 18.

At decision step 50, a check is again made to determine if a TCN error exists. If a TCN error does not exist, then at step 54, a buffer is written to the alternate tape 18. After the buffer is written to the alternate tape 18, step 58 indicates that the original tape 12 is checked to verify that it was written without error. This verification is done by examining feedback from the original device. Decision step 62 indicates that if no errors are detected in the original tape 12, then at step 66 the alternate tape 18 is checked to verify that it was written without errors, if an alternate tape 18 was written. This verification is done in the same way that the original tape 12 was checked, namely by examining feedback from the device.

If an error in the original tape 12 is detected at decision step 62, then decision step 70 indicates that a check is made to determine if the error means that the end of the volume (EOV) has been reached. Step 74 indicates that if EOV has been reached, the original and alternate tapes 12 and 18 are demounted and marked full, and the process returns to step 34 where a new volume of the original tape 12 is mounted (i.e. a new tape is mounted). If decision step 70 indicates that the error detected at step 62 is anything other than an EOV condition, then step 78 indicates that the data set buffer control is reset. This means that the buffer content is voided in preparation for restarting at a synchronized point on new tapes. After the data set buffer control is reset in step 78, step 74 indicates that the tapes 12 and 18 are marked full, as was done in the case of an EOV error, and the process returns to step 34 where a new volume of the original tape 12 is mounted.

Step 64 indicates that if no error is detected in step 62, another check is made to determine if a TCN error exists. If a TCN error exists, the algorithm jumps to decision step 90. If there are no TCN errors, then the algorithm proceeds to step 66. After the alternate tape 18 is checked in step 66, decision step 82 queries whether an error has been detected in the alternate tape 18. If an error is detected, then a tape copy needed (TCN) error flag is set at step 86. If an error is not detected or after a TCN error flag has been set, decision step 90 queries if there are more buffers to write to these volumes. If there are more buffers to write, then arrow 94 indicates that the process returns to step 46 where the next buffer is written to the original tape 12. If the query in decision step 90 shows that there is no more data to write, then step 98 indicates that end of volume is forced. Force end of volume means that this process explicitly requests that the target tape be ended versus delaying until the tape cannot contain any more data and the tape be ended implicitly. An implicit EOV is called a natural EOV. In either case, a new tape is mounted. Once end of volume has been forced, the tapes 12 and 18 are demounted from the drives 14 and 20 and the tape inventory records are updated to reflect the status of the tapes 12 and 18 as being full and complete. Force end of volume will always occur at a user specified (or default) tape percent full setting on the tapes 12 and 18.

Decision step 102 indicates that after the tapes 12 and 18 have been demounted, a test is made to determine if a TCN error has occurred. A TCN error would exist if a TCN error flag was ever set on for this output stream. Step 106 indicates that if a TCN error exists, the TCN record is written to a persistent file and a tapecopy is scheduled. Scheduling a tapecopy means that a request to copy a specific tape is submitted to a server that performs tapecopy.

When writing in a degraded mode, a TCN record is written to an inventory (a persistent file) at the same time the tapecopy request is submitted to the tapecopy server. Should the scheduled tapecopy fail or not be processed before the server is shut down, then an automatic function can resubmit the tapecopy request from the retained TCN record. When a tapecopy is submitted, an in-storage control block is passed to a tapecopy server. If the server is unsuccessful when attempting the tapecopy (so the TCN is not deleted), or if the server is stopped before the server processes the in-storage request, the TCN record still exists in inventory on DASD. The in-storage request is lost if HSM is stopped.

If it is determined at step 102 that there has been no TCN error, or after the tapecopy has been scheduled in step 106, decision step 110 indicates that a query is made to determine if more data exists to be written to new volumes of this output stream. Step 90 already determined that there was no more data to write to this volume pair. If step 110 indicates that there is more data to write, then the algorithm returns to step 34 and continues. If step 110 indicates that there is no more data to write, then terminal step 114 indicates that the process has reached an end.

Figure 3:
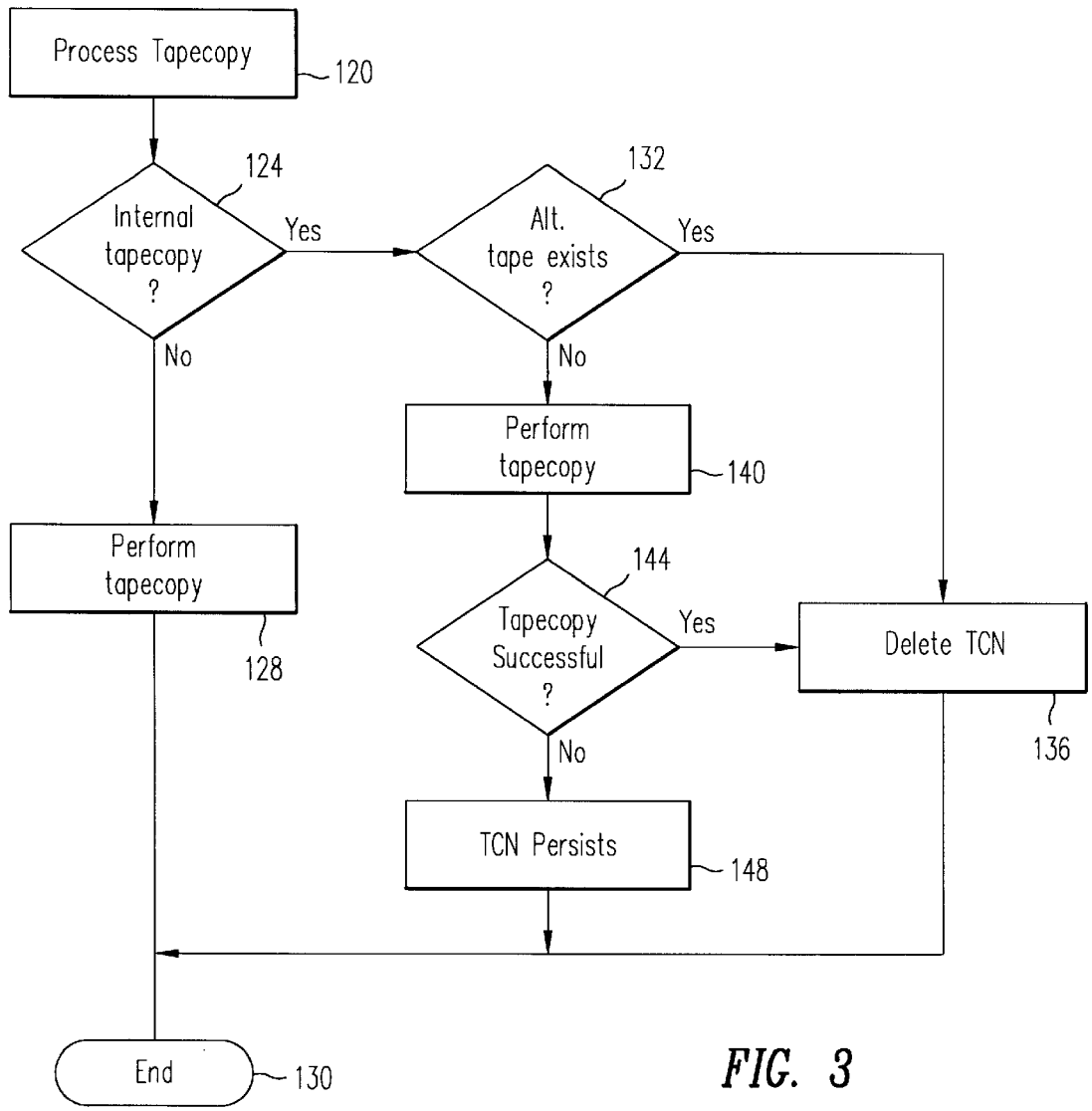
FIG. 3 is a flowchart that illustrates a tapecopy process according to the present invention.

FIG. 3 illustrates the process by which a tapecopy (TCN) request is processed. In step 120, a tapecopy command is detected by the tapecopy server. In decision step 124, a determination is made as to whether the tapecopy request was generated directly by a user, or whether it is internal. An internal tapecopy request is software generated as opposed to being generated by a user. For example, the tapecopy request from step 106 (FIG. 2B) is an internal tapecopy request. If the tapecopy request is not internal (i.e. is user requested), step 128 indicates that a copy of the original tape 12 is made (i.e. a tapecopy is performed). After step 128, the terminal step 130 indicates that the algorithm ends.

If the tapecopy request in step 124 is internal, step 132 indicates that a determination is made as to whether the alternate tape 18 already exists. If the alternate tape 18 already exists, then step 136 indicates that the TCN record is deleted. If the alternate tape 18 does not exist, then step 140 indicates that a tapecopy is performed (as in step 128). Decision step 144 then determines if the tapecopy was successful. If the tapecopy is successful, the TCN record is deleted (step 136). If the tapecopy is not successful, step 148 indicates that the TCN record persists and will be processed again later.

Figure 4:
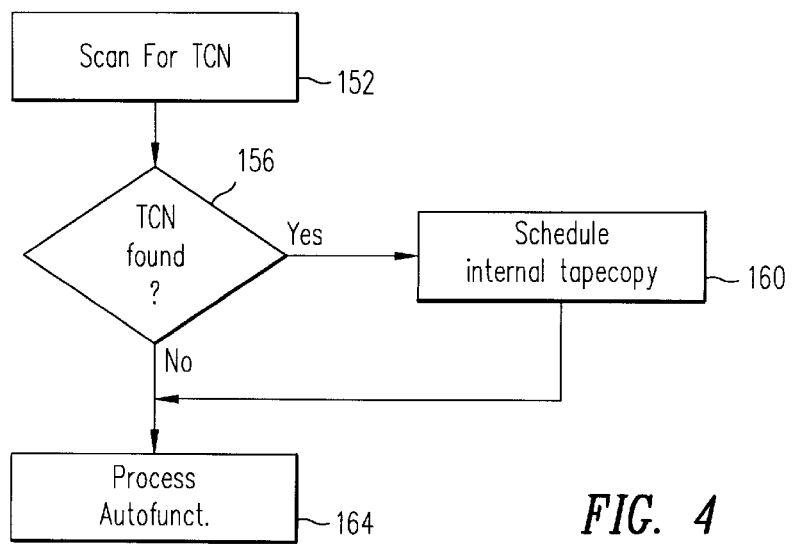
FIG. 4 is a flowchart that illustrates an autofunction process according to the present invention.

FIG. 4 illustrates other ways that tapecopys related to TCN records are requested. Some functions such as disaster recovery are not well suited to creating duplex copies concurrently. Also, if a scheduled internal tapecopy fails, there needs to be some way that the retained TCN record results in another attempt to make the copy. Step 152 indicates that during the startup of a periodic automatic function, the automatic function scans for TCN records. Step 156 indicates that a check is made to determine if any TCN records are found. Step 160 indicates that when a TCN record is found, an internal tapecopy is submitted. After the appropriate internal tapecopy request is submitted, or if there are no TCN records detected in step 156, step 164 indicates that the algorithm goes ahead with its automatic function. Examples of automatic functions include secondary space management and automatic backup functions.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for creating a duplicate copy of a tape comprising:

allocating a first tape having a first data set name and a second tape having a second data set name;

determining if a TCN flag exists indicating that a copy of the first tape needs to be made;

writing a first buffer to the first tape;

writing the first buffer to the second tape in a manner that ensures that block for block the data on the second tape is located at the same position as on the first tape;

checking if the first tape was written without errors;

checking if the second tape was written without errors;

checking if an additional buffer needs to be written to the first tape and the second tape; and forcing an end of volume condition if there are no additional buffers to be written to the first tape and second tape.

2. The method of claim 1 further comprising:

after writing the first buffer to the first tape and before writing the first buffer to the second tape, determining if a TCN flag exists indicating that a copy of the first tape needs to be made.

3. The method of claim 1 further comprising:

after checking if the first tape was written without errors and before checking if the second tape was written without errors, determining if a TCN flag exists indicating that a copy of the first tape needs to be made.

4. The method of claim 1 further comprising:

after checking if the first tape was written without errors, determining that an error has occurred in the writing of the first tape; and checking if the error means that an end of volume for the first tape has been reached.

5. The method of claim 4 further comprising:

if an end of volume condition exists, marking the first tape and the second tape full.

6. The method of claim 4 further comprising:

the end of volume condition does not exist, voiding the content of the first buffer.

7. The method of claim 1 further comprising:

if an error in the second tape is detected while checking if the second tape was written without errors, turning on a tape copy needed flag that indicates a copy of the first tape needs to be made.

8. The method of claim 1 further comprising:

after forcing the end of volume condition if there are no additional buffers to be written, determining if a TCN flag exists indicating that a copy of the first tape needs to be made.

9. The method of claim 8 further comprising:

if the TCN flag exists, submitting a request to a server to copy the first tape.

10. The method of claim 9 further comprising:

writing a TCN record to a persistent file.

11. The method of claim 8 further comprising:

if the TCN flag does not exist, checking if more data exists to be written to new volumes.

12. The method of claim 8 further comprising:

if the TCN flag exists, determining if the TCN flag indicates an internal request; and if the TCN flag indicates an internal request, checking if the second tape already exists.

13. The method of claim 12 further comprising:

if the second tape does not exist, performing a tapecopy of the first tape;

determining if the tapecopy was successful; and if the tapecopy was successful, deleting the TCN flag.

14. The method of claim 7 further comprising:

if the tape copy needed flag has been turned on, determining if the tape copy needed flag is an internal request; and if the tape copy needed flag is an internal request, checking if the second tape already exists.

15. The method of claim 14 further comprising:

if the second tape does not exist, performing a tapecopy of the first tape;

determining if the tapecopy was successful; and if the tapecopy was successful, deleting the tape copy needed flag.

16. The method of claim 1 wherein the first tape is located at a first physical location and the second tape is located at a second physical location.

* * * * *